US009117456B2

(12) United States Patent
Matsumoto

(10) Patent No.: US 9,117,456 B2
(45) Date of Patent: Aug. 25, 2015

(54) NOISE SUPPRESSION APPARATUS, METHOD, AND A STORAGE MEDIUM STORING A NOISE SUPPRESSION PROGRAM

(75) Inventor: Chikako Matsumoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 930 days.

(21) Appl. No.: 13/279,830

(22) Filed: Oct. 24, 2011

(65) Prior Publication Data

US 2012/0134509 A1 May 31, 2012

(30) Foreign Application Priority Data

Nov. 25, 2010 (JP) ................................ 2010-262922

(51) Int. Cl.
*H04B 15/00* (2006.01)
*G10L 21/0208* (2013.01)
*G10L 21/0216* (2013.01)

(52) U.S. Cl.
CPC ......... *G10L 21/0208* (2013.01); *G10L 21/0216* (2013.01)

(58) Field of Classification Search
CPC ........................ G10L 21/0208; G10L 21/0216
USPC ........................................................ 381/94.3
See application file for complete search history.

(56) References Cited

U.S. PATENT DOCUMENTS

| | | | |
|---|---|---|---|
| 6,629,070 B1 | 9/2003 | Nagasaki | |
| 2007/0274536 A1 | 11/2007 | Matsuo | |
| 2011/0268288 A1 * | 11/2011 | Tanaka et al. | 381/71.1 |

FOREIGN PATENT DOCUMENTS

| | | | |
|---|---|---|---|
| JP | 10-3297 A | 1/1998 |
| JP | 2000-172283 A | 6/2000 |
| JP | 2004-341339 A | 12/2004 |
| JP | 2007-318528 | 12/2007 |
| JP | 2008-309955 A | 12/2008 |
| JP | 2009-20460 A | 1/2009 |
| WO | WO 2010058804 A1 * | 5/2010 |

OTHER PUBLICATIONS

Office Action issued May 20, 2014 in Japanese Patent Application No. 2010-262922 (with partial English language translation).

* cited by examiner

*Primary Examiner* — Joseph Saunders, Jr.
(74) *Attorney, Agent, or Firm* — Oblon, McClelland, Maier & Neustadt, L.L.P.

(57) ABSTRACT

A noise suppression apparatus includes: a conversion unit to convert a recorded sound signal in a time domain into a spectrum in a frequency domain; a setting unit to set a suppression gain indicating a degree of suppression on each spectrum for each frequency spectrum on the basis of a nonstationarity-value variation in time of the respective spectrum; a suppression unit to suppress each of the spectrum on the basis of the suppression gain set by the setting unit for each frequency spectrum; and an inverse conversion unit to perform an inverse conversion to the conversion by the conversion unit on the spectrum having been subjected to the suppression processing by the suppression unit.

14 Claims, 11 Drawing Sheets

NOISE SUPPRESSION APPARATUS, METHOD, AND A STORAGE MEDIUM STORING A NOISE SUPPRESSION PROGRAM

CROSS-REFERENCE TO RELATED APPLICATION

This application is based upon and claims the benefit of priority of the prior Japanese Patent Application No. 2010-262922, filed on Nov. 25, 2010, the entire contents of which are incorporated herein by reference.

FIELD

Embodiments discussed herein relate to an audio-signal processing technique for reducing a noise component included in a signal produced by recording a sound of a sounding body.

BACKGROUND

Several audio-signal processing techniques that reduce noise components included in a recorded sound signal obtained by recording a sound of a speaker by a microphone, etc., have been known. For example, Japanese Unexamined Patent Application Publication Nos. 10-003297, 2007-318528, 2004-341339, and 2000-172283 are some examples.

First, as a first technique, there is a technique in which an output signal having a different noise elimination characteristic is selected on the basis of whether a signal component of a human voice included in an input audible signal is a voiced sound or an unvoiced sound. By the first technique, it is possible to eliminate background noise. Also, in the first technique, a short-time average and a long-time average are calculated on the time axis of the input audible signal. And in the first technique, if a difference between the calculated short-time average and long-time average is greater than a first threshold value, it is determined that the audible signal includes a voice component. Alternatively, in the first technique, whether a voice component is included in an input audible signal or not is determined on the basis of a comparison result between a signal-to-noise ratio of the input audible signal and the first threshold value. Also, in the first technique, whether a voice component included in an input audible signal is a voiced sound or an unvoiced sound is determined by a magnitude relationship between a signal-to-noise ratio of the input audible signal and a second threshold value, and a magnitude relationship between a power ratio of a maximum value on the frequency axis of the input audible signal to an estimated background noise and a third threshold value.

Also, as a second technique, a technique in which an audio signal originated from a sound source in a certain direction is emphasized and surrounding noise is suppressed is known. In the second technique, when an audio signal including voices, noise, etc., originated from sound sources existing in a plurality of directions are input using a plurality of microphones, processing for determining whether the audio signal is coming from a direction of a speaker or not is performed on the basis of phase differences among the microphones for each frequency.

Also, as a third technique, spectral shapes of audio signals divided into a plurality of frequency bands are analyzed for each frequency, and are grouped into voices, noise, or voice-like noise. And in the third technique, a technique, in which best-suited noise suppression processing selected in accordance with the group is performed for each band, is also known.

In this regard, as another technique, a technique of determining whether it is a state of including a voice signal or a state of not including a voice signal in order to perform efficient audio coding is known. For example, an element value to be a basis of determination of whether a frame-divided voice signal is included or not is calculated for each section further divided into a shorter section than that frame, which is a processing unit of audio coding processing. And in this technique, it is known that the above-described determination is made on the basis of a size of the calculated value and degrees of change.

SUMMARY

According to an aspect of the invention, a noise suppression apparatus includes: a conversion unit configured to convert a recorded sound signal in a time domain into a spectrum in a frequency domain; a setting unit configured to set a suppression gain indicating a degree of suppression on each frequency spectrum on the basis of a nonstationarity-value variation in time of the respective spectrum; a suppression unit configured to suppress each of the spectrum on the basis of the suppression gain set by the setting unit for each frequency spectrum; and an inverse conversion unit configured to perform an inverse conversion to the conversion by the conversion unit on the spectrum having been subjected to the suppression processing by the suppression unit.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

DESCRIPTION OF EMBODIMENTS

In elimination of background noise by the first technique, it is difficult to suppress instantaneous nonstationary noise mixed in an audio signal. The instantaneous nonstationary noise is noise that has a duration of about 10 milliseconds, and is one-shot or intermittent noise. If instantaneous nonstationary noise is included in a signal component of a human voice, there is a possibility that the first technique determines the entire signal component including nonstationary noise to be a human voice.

Also, in the second technique, it is necessary to use a plurality of microphones to collect sound from a sound source, and thus it is not possible to use this technique in the case where only one microphone is provided. Also, if there is a noise source of the instantaneous nonstationary noise in a same direction as that of the speaker, it is not possible to emphasize only a speaker voice, and to suppress only nonstationary noise by the second technique.

Therefore, a noise suppression apparatus which suppresses the nonstationary noise from a recorded sound signal including instantaneous nonstationary noise that is combined with sound of a sounding body is proposed.

Figure 1:
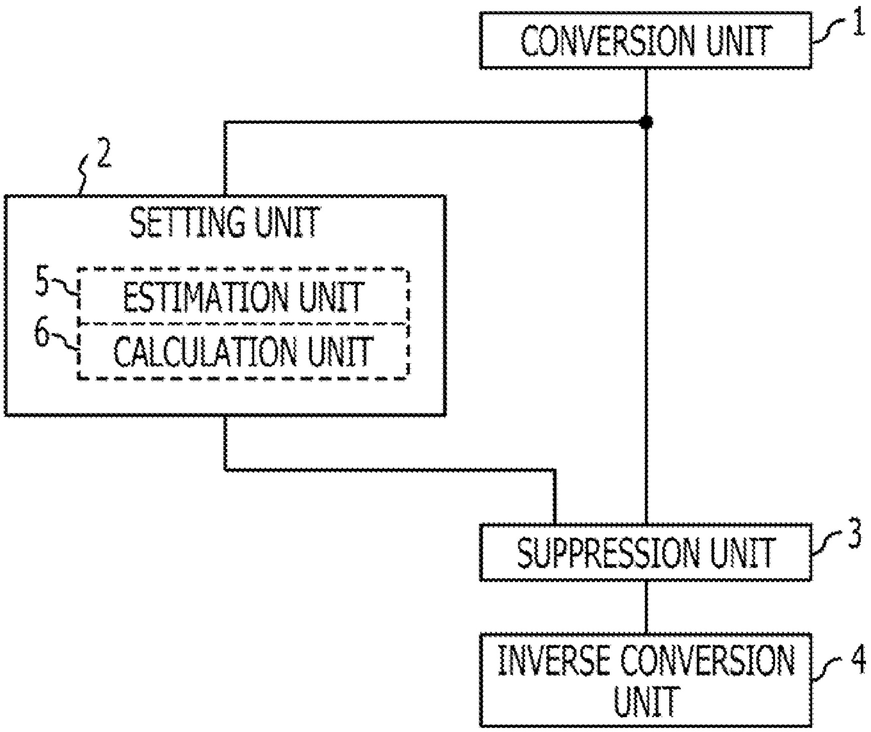
FIG. 1 is a functional block diagram of a noise suppression apparatus according to an embodiment.

First, a description will be given of FIG. 1. FIG. 1 is a functional block diagram of a noise suppression apparatus according to an embodiment. The noise suppression apparatus includes a conversion unit 1, a setting unit 2, a suppression unit 3, and an inverse conversion unit 4.

The conversion unit 1 converts a recorded sound signal expressed in time domain into a spectrum in frequency domain. In this regard, the recorded sound signal is a signal obtained by recording sound of a sounding body.

The setting unit 2 sets a suppression gain for each frequency of a spectrum on the basis of nonstationarity-value variation in time for each spectrum. In this regard, the suppression gain is a value indicating a degree of suppression of each spectrum.

The suppression unit 3 performs processing for suppressing each spectrum on the basis of a suppression gain set by the setting unit 2 for each frequency of a spectrum.

The inverse conversion unit 4 performs inverse conversion to the conversion by the conversion unit 1 on a spectrum having been subjected to suppression processing by the suppression unit 3 so as to perform conversion into a time-domain signal.

Figure 2A:
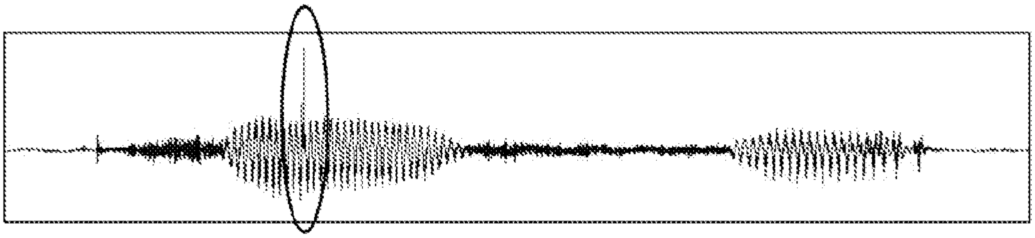
FIGS. 2A to 2C are examples of waveforms of recorded sound signals including instantaneous nonstationary noise.
Figure 2B:
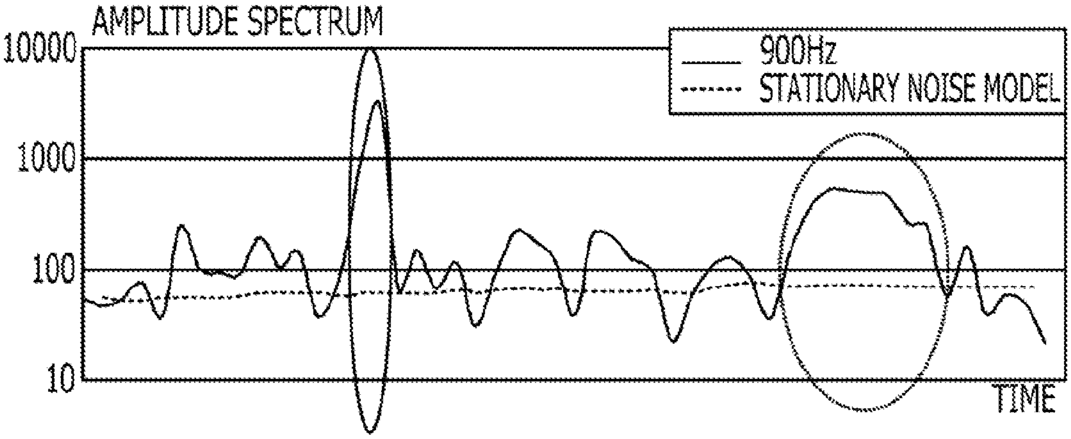
Figure 2C:
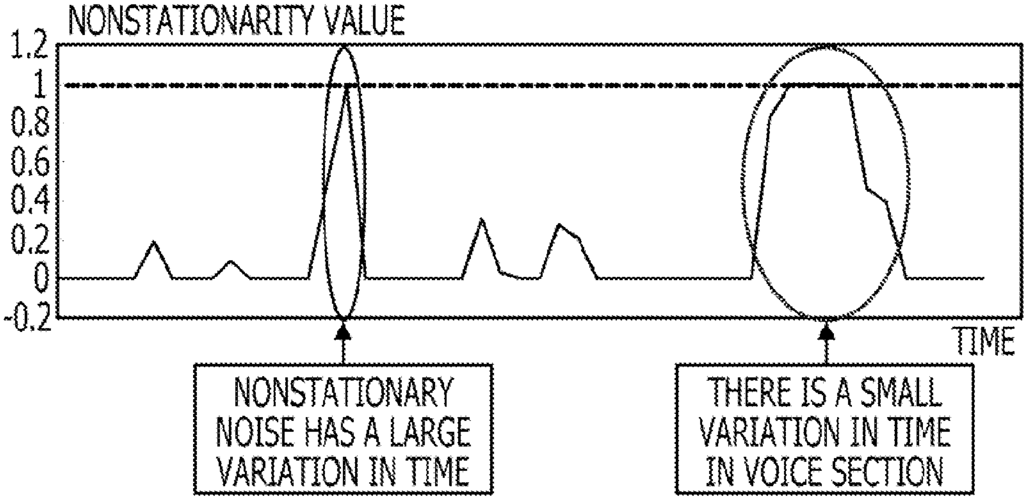

This noise suppression apparatus performs suppression of nonstationary noise using a fact that a spectrum size of a recorded sound signal including instantaneous nonstationary noise changes temporarily and suddenly at a point in time that includes nonstationary noise. A description will be given of this method with reference to FIG. 2A to FIG. 2C. FIG. 2A to FIG. 2C are examples of waveforms of a recorded sound signal including instantaneous nonstationary noise.

The horizontal axis of the waveforms in FIG. 2A to FIG. 2C show passage of time.

FIG. 2A is an example of a waveform of a recorded sound signal in the case where instantaneous nonstationary noise is mixed in the middle of recording vocal sound of a human body, which is an example of a sounding body. And an abrupt pulse-state waveform in an oval drawn on the waveform indicates instantaneous nonstationary noise.

A solid-line waveform in FIG. 2B shows variations in time of a spectrum in the vicinity of a frequency of 900 Hz in the case of converting the recorded sound signal in FIG. 2A. A relatively abrupt peak in a solid-line oval drawn in FIG. 2B indicates instantaneous nonstationary noise. On the other hand, a relatively gentle peak in a dotted-line oval described in FIG. 2B is not instantaneous nonstationary noise, but is sound generated by a human voice.

In this regard, a broken-line waveform in FIG. 2B shows variations in time of an amplitude spectrum of a stationary noise model on the recorded sound signal whose waveform is shown in FIG. 2A. In this regard, the stationary noise model is a stationary noise component included in the recorded sound signal, which is estimated on the basis of the recorded sound signal. The stationary noise component is a noise component continuously included in the recorded sound signal.

Also, the waveform in FIG. 2C shows a variation in time of the nonstationarity value calculated on the basis of the SNR (Signal to Noise Ratio). In this regard, the SNR is a ratio of the amplitude spectrum shown by the waveform in FIG. 2B to the stationary noise model. A description will be given later of a method of specifically calculating the nonstationarity value in the present embodiment. The nonstationarity value has a value from 0 to 1, and indicates that the higher the value, more nonstationary components are included in the spectrum.

A relatively abrupt peak in a solid-line oval drawn on the waveform in FIG. 2C indicates instantaneous nonstationary noise. On the other hand, a relatively gentle peak in a dotted-line oval described on the waveform is not instantaneous nonstationary noise, but is sound generated by a human voice. As is understood from a comparison between the two peaks, a variation of the nonstationarity value per unit time is remarkably larger and more abruptly changes in the case of instantaneous nonstationary noise than in the case of a human voice sound.

In the noise suppression apparatus in FIG. 1, attention is given to the above-described characteristic, and a place having a remarkably large variation of nonstationarity value in time is detected from a spectrum of the recorded sound signal. And the noise suppression apparatus regards the detected place as instantaneous nonstationary noise, and suppresses the noise so as to eliminate instantaneous nonstationary noise mixed in the recorded voice sound. More specifically, in the noise suppression apparatus, first, the setting unit 2 determines which of the components, namely, voice components or noise components, are dominantly included in each spectrum for the spectrum of the recorded sound signal on the basis of a nonstationarity-value variation in time for each spectrum. And for the spectrum determined to be noise in this determination, the setting unit 2 sets a suppression gain such that the value of that spectrum becomes small by suppression processing in the suppression unit 3. As a result, a signal having suppressed nonstationary noise is obtained from the recorded sound signal from inverse conversion by the inverse conversion unit 4.

In this regard, as illustrated in FIG. 1, the setting unit 2 of the noise suppression apparatus may include an estimation unit 5 and a calculation unit 6.

The estimation unit 5 estimates an amount of a stationary noise component included in each frequency spectrum.

The calculation unit 6 calculates a ratio of a nonstationary component included in each spectrum as a nonstationarity value for each frequency spectrum on the basis of each spectrum value and an amount of stationary noise component for each spectrum estimated by the estimation unit 5.

In this case, the setting unit 2 sets the suppression gain for each frequency spectrum on the basis of the variation in time of the nonstationarity value calculated by the calculation unit 6 for each frequency spectrum.

In this regard, estimation by the estimation unit 5 is performed, for example, by calculating an average value of spectrum value in a period not including sound of a sounding body in the recorded sound signal for each frequency of the above-described spectrum. In this case, the average value is used for the estimation result of the amount of the stationary noise component.

Also, the setting unit 2 may set the suppression gain, for example, as follows.

That is to say, the setting unit 2 determines first whether each spectrum component is nonstationary noise or not for each frequency spectrum on the basis of nonstationarity-value variation in time for each spectrum. And the setting unit 2 sets a suppression gain for a spectrum including a component determined to be nonstationary noise so as to make the spectrum value small. On the other hand, the setting unit 2 sets a suppression gain for a spectrum including a component not determined to be nonstationary noise so as to maintain the spectrum value.

In this regard, the setting unit 2 may determine whether each spectrum component is nonstationary noise or not by any one of the methods explained as follows.

In a first method, the setting unit 2 compares in size the nonstationarity-value variation in time of the determination-target spectrum and a certain upper-limit threshold value. And the comparison result is used as a result of the above-described determination. That is to say, if the nonstationarity-value variation in time of the determination-target spectrum is larger than an upper-limit threshold value, the setting unit 2 determines that the spectrum component is nonstationary noise. On the other hand, if the nonstationarity-value variation in time of the determination-target spectrum is smaller than the upper-limit threshold value, the setting unit 2 determines that the spectrum component is not nonstationary noise.

Also, in a second method, some of spectra of a recorded sound signal are determined to be local maximum spectra and local minimum spectra. And the setting unit 2 makes a determination on the basis of a disposition relationship between each spectrum and a local maximum spectrum and a local minimum spectrum on the frequency axis. In this regard, a spectrum determined to be a local maximum spectrum is a spectrum having nonstationarity-value variation in time greater in size than a certain upper-limit threshold value among the spectra disposed on the frequency axis. Also, a spectrum determined to be a local minimum spectrum is a spectrum having nonstationarity-value variation in time smaller than a certain lower-limit threshold value among the spectrum disposed on the frequency axis.

Further, in the second method, a spectrum group is determined by grouping a plurality of local maximum spectra that are consecutive on the frequency axis. In this regard, for an isolated local maximum spectrum which is not consecutive on the frequency axis and is sandwiched between spectra that are not local maximum spectra, a spectrum group is determined by only the one local maximum spectrum.

The setting unit 2 extracts a spectrum group that exists as only one group near a pair of adjacent local minimum spectra among spectrum groups. In this regard, a pair of adjacent local minimum spectra includes one of local minimum spectra disposed in order of frequency on the frequency axis and one local minimum spectrum next to the one local minimum spectrum in order of frequency on the frequency axis. In this regard, even if one or more other spectra are sandwiched between the pair of adjacent local minimum spectra and the spectrum group, the setting unit 2 extracts the spectrum group. Here, the setting unit 2 determines the local maximum spectrum included in the extracted spectrum group to have a spectrum component that is nonstationary noise.

The local maximum spectrum included in a spectrum group extracted as described above has a characteristic in that a nonstationarity-value variation in time is remarkably large compared with the other spectra in the vicinity on the frequency axis. Accordingly, such a local maximum spectrum can be estimated to include a component that is nonstationary noise with higher reliability than that by the above-described first method.

In this regard, the setting unit 2 determines that the other spectra excluding the local maximum spectrum included in the spectrum group extracted as described above have a spectrum component that is not nonstationary noise among the spectra of the recorded sound signal.

Using a second method for the above-described determination, fidelity of sound generated by a sounding body expressed by a signal after having been subjected to suppression of nonstationary noise is improved.

Also, in the third method, in substantially the same manner as the second method, the setting unit 2 first extracts a spectrum group that exists as only one group near a pair of adjacent local minimum spectra among spectrum groups. Next, the setting unit 2 counts existing numbers of the other spectra that are sandwiched between the extracted spectrum group and the pair of adjacent local minimum spectra on the frequency axis at the upper side and lower side, respectively, on the frequency axis of the spectrum group. Here, if the existing number of the spectra individually counted are both 0 or not greater than a certain threshold number, the setting unit 2 determines the local maximum spectrum included in the spectrum group to include a spectrum component that is nonstationary noise.

Such a local maximum spectrum is limited to a spectrum that is remarkably larger than the other spectra having nonstationarity-value variation in time in the vicinity on the frequency axis among the spectra determined to be nonstationary noise by the above-described second method. Accordingly, it is possible to estimate that such a local maximum spectrum includes a component that is nonstationary noise with further higher reliability than the above-described second method.

In this regard, the setting unit 2 determines that the other spectra excluding the local maximum spectrum determined to be nonstationary noise as described above have a spectrum component that is not nonstationary noise among the spectra of the recorded sound signal.

Using the third method for the above-described determination, fidelity of sound generated by a sounding body expressed by a signal after having been subjected to suppression of nonstationary noise is further improved.

In this regard, the setting unit 2 may set a suppression gain value for a suppression-target spectrum, which is a spectrum having been determined to include a component that is nonstationary noise using either of methods exemplified as follows.

In the first method, first, the setting unit 2 selects each one spectrum having a frequency nearest to the suppression-target spectrum in the upper side and the lower side of the frequency from spectra smaller than the above-described upper-limit threshold value among the above-described spectra disposed on the frequency axis. And the setting unit 2 sets a value produced by dividing the average value of the selected two spectrum values by the suppression-target spectrum value as a suppression gain for the suppression-target spectrum.

Also, in the second method, the estimation unit 5 is used. In this method, the setting unit 2 sets, as a suppression gain for the suppression-target spectrum, the amount of the stationary noise component estimated by the estimation unit 5 for the frequency of the suppression-target spectrum divided by the value of the suppression-target spectrum.

In this regard, the calculation unit 6 may calculate a nonstationarity value for each spectrum as the following method.

In this method, first, the calculation unit 6 performs calculation of a signal-to-noise ratio for each spectrum for each frequency of the above-described spectrum by dividing each spectrum value by the amount of the stationary noise component for each spectrum estimated by the estimation unit 5. And for a spectrum having this value less than a certain first threshold value, the calculation unit 6 determines a nonstationarity value for the spectrum to be 0 on the basis of a value of a signal-to-noise ratio. Also, for a spectrum having the value of the signal-to-noise ratio still greater than a certain second threshold value that is higher than the certain first threshold value, the calculation unit 6 determines the nonstationarity value for the spectrum to be 1. Further, the calculation unit 6 divides the difference between the signal-to-noise ratio and the first threshold value by the difference between the second threshold value and the first threshold value. And the calculation unit 6 determines the value obtained by the above-described division to be the nonstationarity value of the spectrum for a spectrum having the value of the signal-to-noise ratio higher than the first threshold value and lower than the second threshold value.

In this regard, the calculation unit 6 has a plurality of combinations of the first threshold values and the second threshold values, and may calculate a nonstationarity value using a first threshold value and a second threshold value pertaining to one pair of the combinations selected in accordance with the frequency spectrum whose nonstationarity value is to be calculated.

Also, the calculation unit 6 may calculate the first threshold value for each spectrum as follows. That is to say, first, the calculation unit 6 obtains a difference between each spectrum value and the amount of the stationary noise component estimated by the estimation unit 5 in a period not including sound of a sounding body in the recorded sound signal for each frequency of the above-described spectrum. And the calculation unit 6 calculates the average value of the absolute value of the difference. And the calculation unit 6 adds the calculated average value to the amount of stationary noise component. The calculation unit 6 determines a value produced by dividing the sum value by the amount of the stationary noise component to be the first threshold value. In this regard, in this case, the calculation unit 6 determines a certain constant value added to the first threshold value to be the second threshold value for each spectrum, and calculates a nonstationarity value for each spectrum using the first threshold value and the second threshold value.

Figure 3:
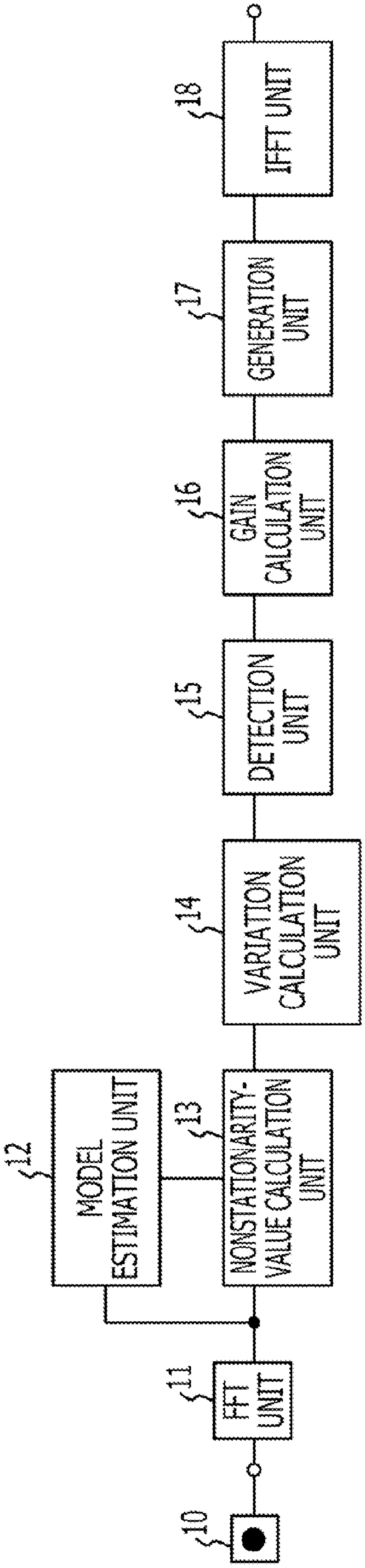
FIG. 3 is a functional block diagram of a noise suppression apparatus according to another embodiment.

Next, a description will be given of FIG. 3. FIG. 3 is a functional block diagram of a noise suppression apparatus according to another embodiment.

The noise suppression apparatus in FIG. 3 includes an FFT unit 11, a model estimation unit 12, a nonstationarity-value calculation unit 13, a variation calculation unit 14, a detection unit 15, a gain calculation unit 16, a generation unit 17, and an IFFT unit 18. And a microphone 10 is connected to the noise suppression apparatus.

The microphone 10 is a sound collection apparatus recording a voice sound of a person, which is an example of a sounding body, and outputs a recorded sound signal representing the recorded voice sound.

The FFT (Fast Fourier Transform) unit 11 performs a fast Fourier transform. The recorded sound signal output from the microphone 10 is expressed in the time domain. Thus, the FFT unit 11 converts signal waveforms of a recorded sound signal for a certain number of samples into a spectrum in frequency domain, and outputs the spectrum. In this regard, in the sampling of the recorded sound signal performed for the fast Fourier transform, it is assumed that sufficient sampling intervals are provided for expressing a human voice sound given by the recorded sound signal. The FFT unit 11 provides functions corresponding to the conversion unit in the noise suppression apparatus in FIG. 1.

The model estimation unit 12 estimates and outputs the amount of stationary noise component included in each frequency spectrum of the recorded sound signal output from the FFT unit 11. In the present embodiment, the model estimation unit 12 calculates an average value of the spectrum values of the period not including a human voice sound. And the model estimation unit 12 outputs the calculation result as an estimation result of the amount of stationary noise component in a certain spectrum. The model estimation unit 12 provides a function of the estimation unit 5 in the noise suppression apparatus in FIG. 1.

The nonstationarity-value calculation unit 13 calculates a nonstationarity value of each spectrum for each frequency spectrum of the recorded sound signal output from the FFT unit 11. In the present embodiment, the nonstationarity-value calculation unit 13 calculates a ratio of the nonstationary component included in the spectrum using a spectrum value and the estimation result of the amount of the stationary noise component recorded sound signal by the model estimation unit 12 for each frequency spectrum. The nonstationarity-value calculation unit 13 outputs the calculation result as a nonstationarity value for the spectrum. Details on the calculation method of nonstationarity value by the nonstationarity-value calculation unit 13 will be described later. The nonstationarity-value calculation unit 13 provides functions corresponding to the calculation unit 6 in the noise suppression apparatus in FIG. 1.

Using a nonstationarity value of each spectrum calculated by the nonstationarity-value calculation unit 13 for each frequency spectrum of the recorded sound signal, the variation calculation unit 14 calculates a variation in time of the nonstationarity value for each frequency spectrum.

The detection unit 15 determines whether each spectrum component is nonstationary noise or not for each frequency spectrum of the recorded sound signal on the basis of the variation in time of the nonstationarity value. Details on the method of determination by the detection unit 15 on whether nonstationary noise or not will be described later. The determination result by the detection unit 15 is transmitted to the gain calculation unit 16 as a detection result of the nonstationary noise.

The gain calculation unit 16 sets a suppression gain indicating a degree of suppression for each frequency spectrum of the recorded sound signal in accordance with the detection result by the detection unit 15. Details of the method will be described later. In the present embodiment, for a spectrum determined to include a component that is nonstationary noise, the gain calculation unit 16 sets a suppression gain so as to make the spectrum value small. Also, for a spectrum determined not to include a component that is nonstationary noise, the gain calculation unit 16 sets a suppression gain so as to maintain the value of the spectrum.

By the above model estimation unit 12, nonstationarity-value calculation unit 13, variation calculation unit 14, detection unit 15, and gain calculation unit 16, functions corresponding to the setting unit 2 in the noise suppression apparatus in FIG. 1 are provided.

The generation unit 17 performs processing for multiplying each frequency spectrum of the recorded sound signal by a suppression gain set by the gain calculation unit 16 for each frequency spectrum of the recorded sound signal, and generates a spectrum of the output signal in frequency domain. The generation unit 17 provides functions corresponding to the suppression unit 3 in the noise suppression apparatus in FIG. 1.

The IFFT (Inverse Fast Fourier Transform) unit 18 performs inverse fast Fourier transform, which is inverse conversion to the conversion by the FFT unit 11. The IFFT unit 18 converts the spectrum in frequency domain, generated by the generation unit 17, into an output signal expressed in time domain, and outputs the signal. The output signal from the IFFT unit 18 is the output of the noise suppression apparatus in FIG. 3.

In this regard, the noise suppression apparatus illustrated in FIG. 1 and FIG. 3 can be configured using a computer having a standard hardware configuration.

Figure 4:
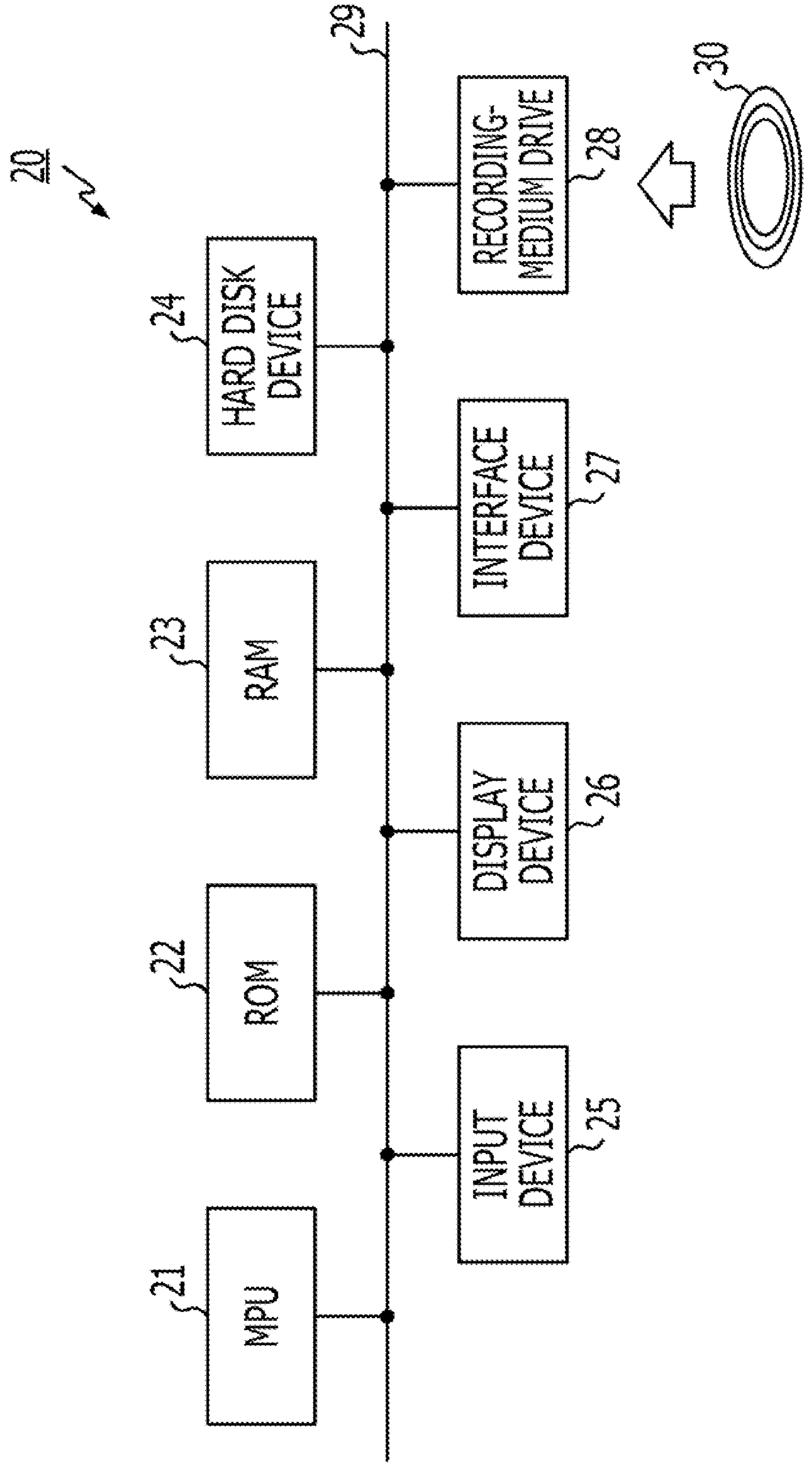
FIG. 4 is an example of a hardware configuration of a computer.

Here, a description will be given of FIG. 4. FIG. 4 is an example of a hardware configuration of a computer, which is an example capable of configuring the noise suppression apparatus illustrated in FIG. 1 and FIG. 3.

A computer 20 includes an MPU 21, a ROM 22, a RAM 23, a hard disk device 24, an input device 25, a display device 26, an interface device 27, and a recording medium drive 28. In this regard, these components are connected through a bus line 29, and are allowed to mutually transfer various kinds of data under the control of the MPU 21.

The MPU (Micro Processing Unit) 21 is a processor controlling operation of the entire computer 20.

The ROM (Read Only Memory) 22 is a read-only semiconductor memory in which a certain basic control program is recorded in advance. The MPU 21 reads and executes the basic control program at the time of starting the computer 20 so as to enable control operation of each component of the computer 20.

The RAM (Random Access Memory) 23 is a semiconductor memory capable of being written and read at any time, and is used as a working storage area as necessary when the MPU 21 executes various control programs.

The hard disk device 24 is a storage device for storing various kinds of control programs to be executed by the MPU 21 and various kinds of data.

The MPU 21 reads and executes a certain control program stored in the hard disk device 24 so that the MPU 21 becomes possible of perform control processing described later.

The input device 25 is, for example, a keyboard, and a mouse. When operated by a user of the computer 20, the input device 25 obtains input of various kinds of information from the user, which is related to the operation contents. And the input device 25 transfers obtained input information to the MPU 21.

The display device 26 is, for example a liquid crystal display, and displays various texts and images in accordance with display data transferred from the MPU 21.

The interface device 27 controls sending and receiving various kinds of data among various devices connected to the computer 20. More specifically, the interface device 27 performs analog-to-digital conversion on the recorded sound signal sent from the microphone 10, transmission of the output signal of the noise suppression apparatus to a subsequent device, etc.

The recording medium drive 28 is a device for reading various kind of control programs and data recorded on a portable recording medium 30. Also, the MPU 21 is allowed to read a certain control program recorded on the portable recording medium 30 through the recording medium drive 28, and to perform the program so as to perform various kinds of control processing described later. In this regard, the portable recording medium 30 includes, for example, a flash memory provided with a connector conforming to a USB (Universal Serial Bus) standard, a CD-ROM (Compact Disc Read Only Memory), a DVD-ROM (Digital Versatile Disc Read Only Memory), etc. A computer-readable medium including the portable recording medium 30 stores the noise suppression program. However, the computer-readable medium does not include a transitory medium such as a propagation signal.

In order to operate such a computer 20 as the noise suppression apparatus, first, a control program for causing the MPU 21 to perform the processing contents of noise-suppression control processing described later is created. The created control program is stored in the hard disk device 24 or on the portable recording medium 30 in advance. And a certain instruction is given to the MPU 21 in order to read and execute the control program. In this way, the MPU 21 functions as each functional block illustrated in FIG. 1 and FIG. 3. And the computer 20 comes to be operating as the noise suppression apparatus.

Figure 5:
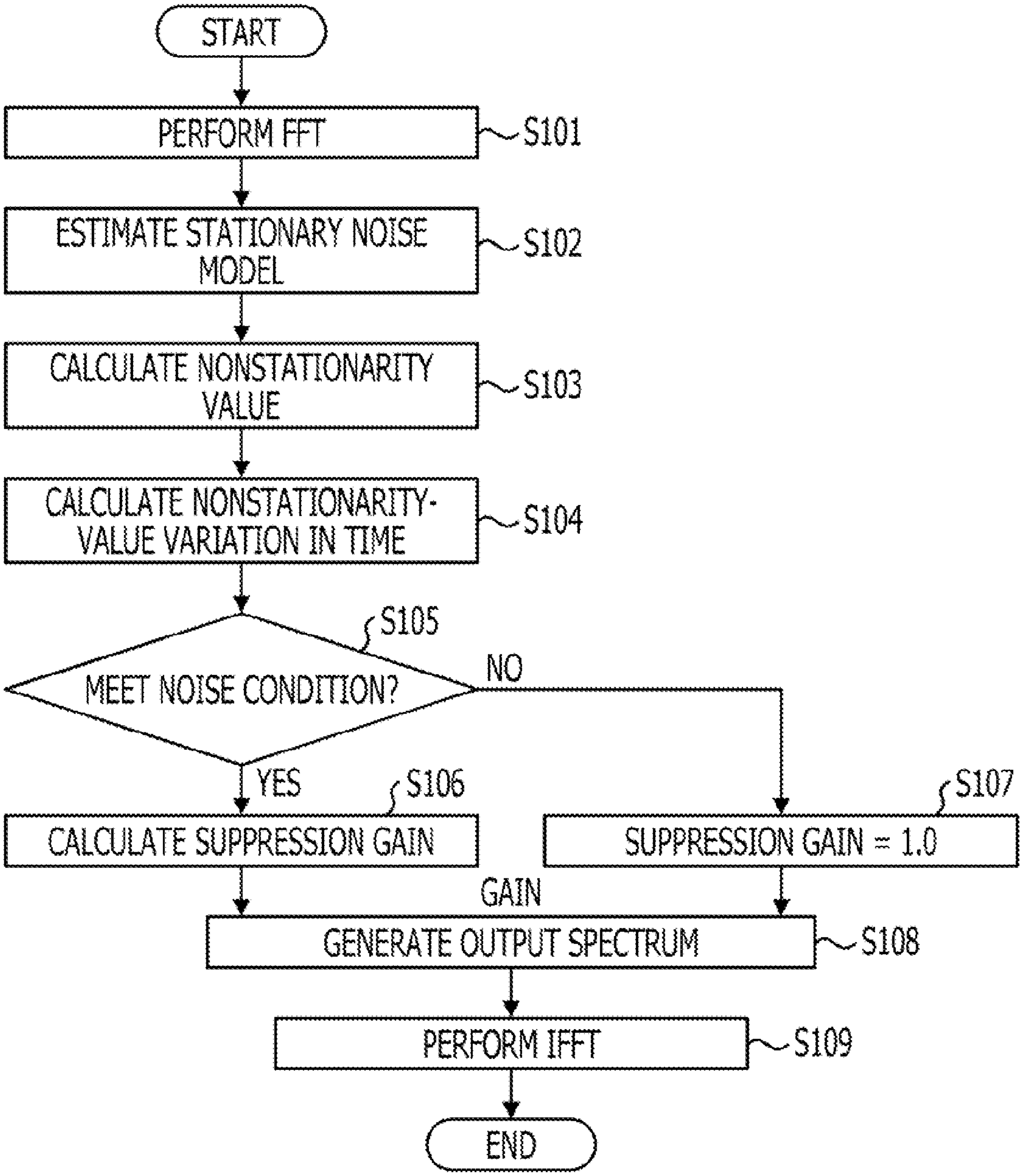
FIG. 5 is a flowchart illustrating processing contents of noise-suppression control processing.

Next, a description will be given of FIG. 5. FIG. 5 is a flowchart illustrating processing contents of the noise-suppression control processing. This processing is started by the user of the noise suppression apparatus giving a certain instruction.

In this regard, here, a description will be given of the case where each functional block of the noise suppression apparatus illustrated in FIG. 3 performs corresponding processing illustrated in FIG. 5.

In FIG. 5, first, in S101, FFT processing is performed by the FFT unit 11. The FFT processing is processing that performs fast Fourier transform on the signal waveform for a certain number of samples in order to perform conversion into a spectrum in frequency domain.

In each processing from S102 to S108, which is to be described in the following, each processing is performed with each spectrum obtained by the FFT processing in S101 as a processing target.

First, in S102, the model estimation unit 12 performs processing to estimate a stationary noise model. This processing is processing for estimating the amount of stationary noise component included in a spectrum to be processed. In the present embodiment, as described above, an average value of signal levels of a recorded sound signal in a period not including a voice sound is calculated, and the calculation result is determined to be an estimation result of the amount of stationary noise component. In this regard, several methods for detecting a period not including a voice sound from a recorded sound signal are widely known, and any one of the methods may be adopted.

As one example of the above-described methods, a cross-correlation efficient is calculated between a signal-data string for a few samples that are produced by dividing a recorded sound signal by a certain time intervals in time direction and signal-data strings before and after that string. Here, if a positive correlation of a certain correlation threshold value or higher is obtained from a data string of a section, the section is determined to include a voice sound. On the other hand, if a positive correlation is not obtained from a data string of a section, the section is determined not to include a voice sound.

Also, as another example of the above-described methods, a ratio of a current value of a spectrum to be determined to the amount of stationary noise component estimated for the spectrum in the past is calculated. Here, if the ratio of the current value of a spectrum is not less than a certain ratio threshold value, the spectrum is determined to include a voice sound. If the ratio is less than the certain ratio threshold value, the spectrum is determined not to include a voice sound.

Next, in S103, the nonstationarity-value calculation unit 13 performs processing for calculating a nonstationarity value. In the processing, a nonstationarity value of a spectrum to be processed is calculated. More specifically, processing for calculating a ratio of a nonstationary component included in a determination-target spectrum is performed using a spectrum value of the determination-target spectrum and the estimation result obtained by the processing in S102. And the calculation result is determined to be a calculation result of the nonstationarity value of the spectrum. In this regard, details of the processing in S103 will be described later.

Next, in S104, the variation calculation unit 14 performs processing for calculating a variation in time of a nonstationarity value. The processing is processing for calculating a variation in time of a nonstationarity value using the nonstationarity value of the spectrum to be processed, which has been calculated by the processing in S103.

Next, in S105, the detection unit 15 performs processing to determine whether the spectrum to be processed meets a noise condition, that is to say, whether a condition for determining that a spectrum component is nonstationary noise is met. Details on this determination will be described later. If the detection unit 15 determines that the spectrum to be processed meets the noise condition in the determination processing (if the determination result is Yes), the processing proceeds to S106. On the other hand, if the detection unit 15 determines that the spectrum to be processed does not meet the noise condition (if the determination result is No), the processing proceeds to S107.

In S107, the gain calculation unit 16 performs processing for setting the suppression gain of the spectrum to be processed to "1.0". After that, the processing proceeds to S108. On the other hand, in S106, the gain calculation unit 16 performs processing for calculating and setting a suppression gain of the spectrum to be processed. Details on the suppression-gain setting processing in S106 and S107 will be given later.

Next, in S108, the generation unit 17 performs processing for generating an output spectrum. That processing is processing for generating a spectrum of the output signal in frequency domain by multiplying a spectrum to be processed by the suppression gain set in S106 or set by the gain setting processing in S107.

Next, in S109, the IFFT unit 18 performs IFFT processing. The processing is processing for converting a spectrum in frequency domain obtained processing up to S108 into a signal expressed in time domain. Further, the processing is processing for outputting the obtained signal as an output signal of the noise suppression apparatus. When the processing is complete, the noise-suppression control processing in FIG. 5 terminates.

The above processing is noise-suppression control processing.

In this regard, when the noise suppression apparatus illustrated in FIG. 1 performs the noise-suppression control processing in FIG. 5, each functional block of the noise suppression apparatus performs each processing in FIG. 5 by sharing as follows. That is to say, first, the conversion unit 1 performs the FFT processing in S101. Also, the setting unit 2 performs the stationary-noise-model estimation processing in S102, the nonstationarity-value calculation processing in S103, the calculation processing of nonstationarity-value variation in time in S104, the determination processing S105, and the suppression-gain setting processing in S106 and in S107. In particular, the estimation unit 5 performs the stationary-noise-model estimation processing in S102, and the calculation unit 6 performs the nonstationarity-value calculation processing in S103. And the suppression unit 3 performs the output-spectrum generation processing in S108, and the inverse conversion unit 4 performs IFFT processing in S109.

Next, a detailed description will be given of a method of calculating a nonstationarity value by the nonstationarity-value calculation unit 13.

Figure 6:
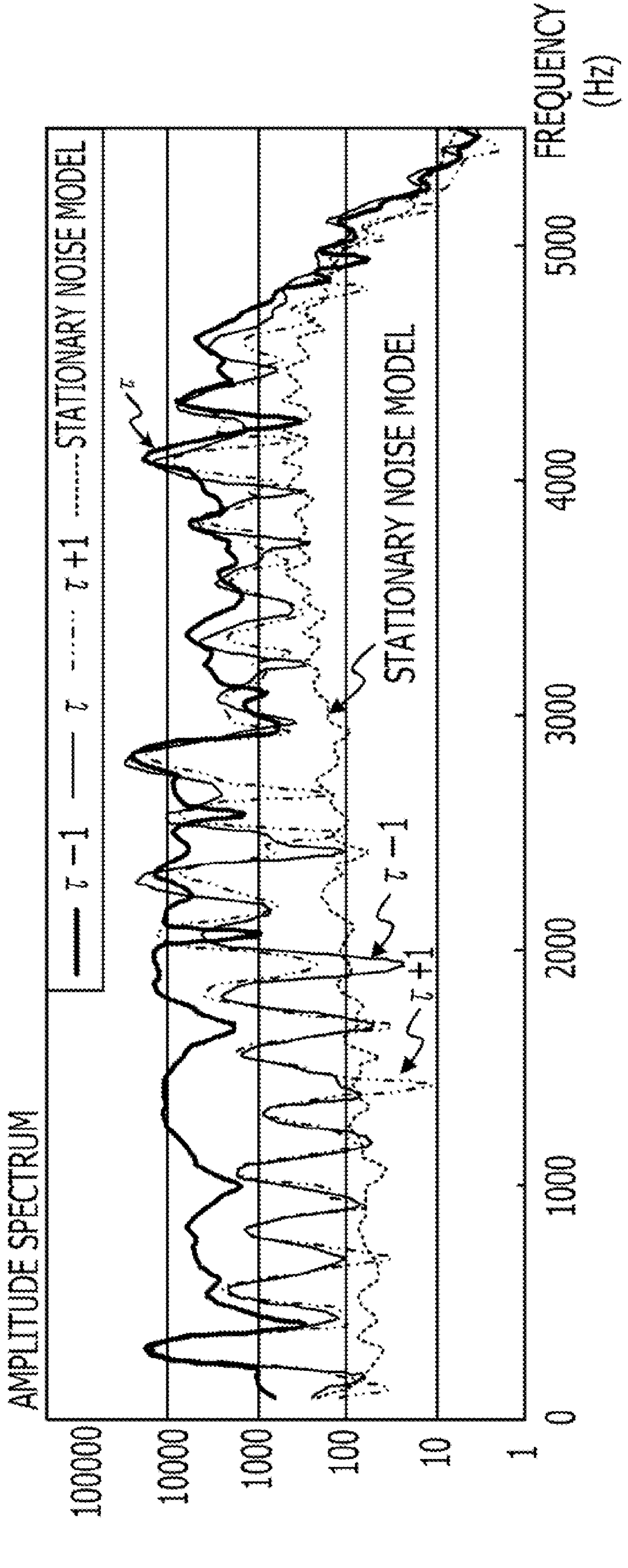
FIG. 6 is an example of a spectral distribution of a recorded sound signal at a point in time when instantaneous nonstationary noise is mixed in, and before and after that point in time.

First, a description will be given of FIG. 6. FIG. 6 is an example of a spectral distribution of a recorded sound signal at the time when instantaneous nonstationary noise was mixed in and before and after that time. FIG. 6 is an example of spectral distribution of the recorded sound signal in the oval illustrated in the waveform in FIG. 2A.

The horizontal axis in FIG. 6 shows frequency, and the vertical axis shows amplitude spectrum.

In FIG. 6, a waveform in "$\tau$" shows a spectral distribution of the recorded sound signal at time $\tau$ when instantaneous nonstationary noise has mixed in. Also, a waveform in "$\tau-1$" shows a spectral distribution of the recorded sound signal at time $\tau-1$, which is one frame of the FFT transform before that time $\tau$. A waveform in "$\tau+1$" shows a spectral distribution at time $\tau+1$, one frame of the FFT transform after that time $\tau$. In this regard, a dotted-line waveform shows the estimation result of the amount of stationary noise component by the model estimation unit 12. The estimation result of the amount of stationary noise component is called a stationary noise model.

In FIG. 6, in both the waveform in "$\tau-1$" and the waveform in "$\tau+1$", a plurality of peaks and troughs having an amplitude spectrum are alternately disposed in accordance with a change in frequency. In general, a human voice sound has a characteristic in which a plurality of peaks and troughs of spectrum waves are alternately disposed in accordance with a change in frequency. In contrast, the shape of the waveform in "$\tau$" is different from the shape of the waveform in "$\tau-1$" and the shape of the waveform in "$\tau+1$". The difference in shape like this arises from the mixture of instantaneous nonstationary noise. On the other hand, a stationary noise model shows a relatively stable shape regardless of whether such instantaneous nonstationary noise has been mixed or not.

Thus, in the present embodiment, attention is given to the above-described SNR, which is a ratio of a spectrum value to a stationary noise model, and the nonstationarity value is calculated using the SNR. More specifically, the nonstationarity-value calculation unit 13 obtains a nonstationarity value NSV of a calculation-target spectrum by calculating a value of the following expression [1].

$$NSV=(SNR-a)/(b-a) \quad [1]$$

Figure 7:
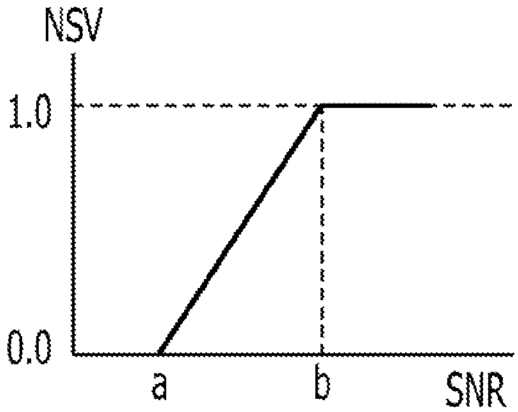
FIG. 7 is a graph expressing a relationship between SNR and nonstationarity value.

Note that in the above-described Expression [1], it is assumed that a first threshold value "a" and a second threshold value "b" are both constants, and the second threshold value b is greater than the first threshold value "a". Also, if an SNR value is less than the first threshold value "a", a value of NSV is 0, and if an SNR value is greater than the second threshold value "b", a value of NSV is 1. FIG. 7 is a graph expressing a relationship between SNR in the Expression [1] and the nonstationarity value NSV. In this manner, the nonstationarity value NSV has a value between 0 and 1.

The higher a value of SNR becomes, the larger is the spectrum value of the calculation-target spectrum compared with stationary noise component. Accordingly, it is understood that the higher a nonstationarity value NSV obtained by Expression [1] becomes, the larger number of nonstationary components are included in the spectrum.

In this regard, for a method of setting values of the first threshold value "a" and the second threshold value "b", there are several methods described later. Any one of the methods may be employed.

A first setting method is to use fixed values (for example, a=2.5, b=6.0) set in advance.

Also, a second setting method is to prepare a plurality of pairs of the first threshold value "a" and the second threshold value "b" in advance. And a first threshold value "a" and a second threshold value "b" pertaining to one of the pairs selected in accordance with a frequency spectrum whose nonstationarity value is to be calculated are set.

In a sound of a human voice sound, which is a sounding body, in the present embodiment, a spectrum in a low-frequency area has more recognizable peaks and troughs in shape. That is to say, a spectrum at a position of a peak tends to have an SNR of a high value. On the other hand, a spectrum in a high-frequency area in a human voice sound has ambiguous peaks and troughs in shape. That is to say, a spectrum at a position of a peak tends to have an SNR of a relatively low value. Thus, in consideration of such a tendency, if a frequency of a spectrum whose nonstationarity value to be calculated is in a low-frequency area, high values are set to the first threshold value a and the second threshold value b. And if a frequency spectrum is in a high-frequency area, low values are set to the first threshold value "a" and the second threshold value "b".

Figure 8A:
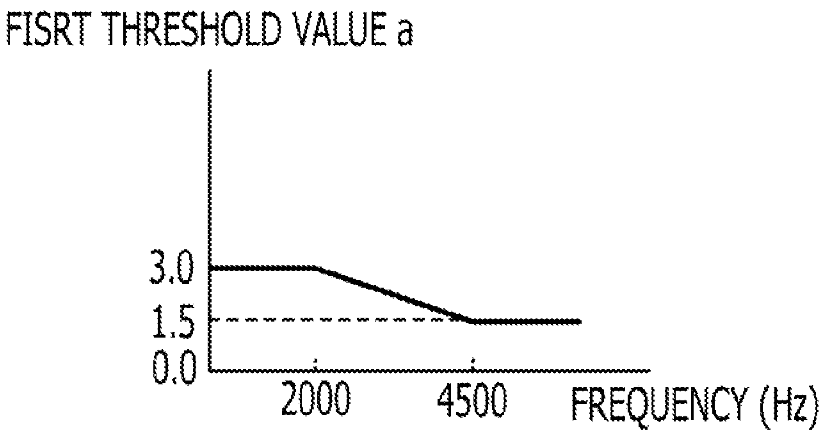
FIG. 8A is an example of setting a first threshold value to be used for calculating a nonstationarity value.
Figure 8B:
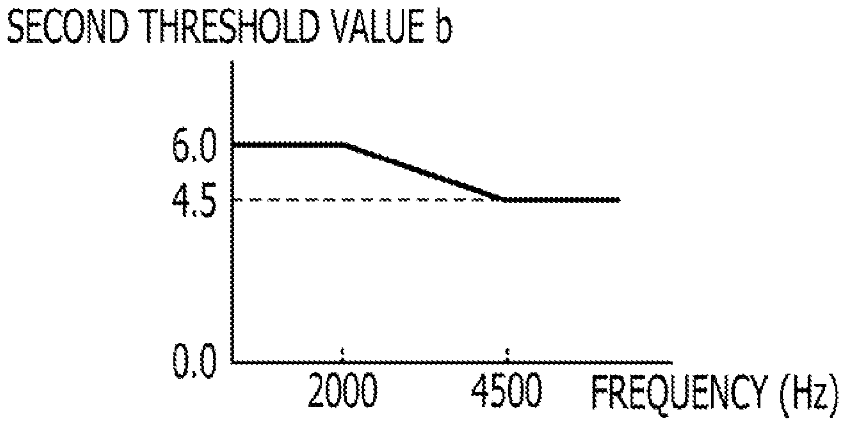
FIG. 8B is an example of setting a second threshold value to be used for calculating a nonstationarity value.

More specifically, for example, a plurality of pairs of the first threshold value a and the second threshold value b, as illustrated in FIG. 8A and FIG. 8B, respectively, are prepared in advance. And a pair of the values in accordance with the frequency spectrum that is the calculation target of the nonstationarity value is selected from the plurality of pairs to be set as the first threshold value a and the second threshold value b. In this regard, in the examples in FIG. 8A and in FIG. 8B, if the frequency spectrum that is the calculation target is not higher than 2000 Hz, the first threshold value a is set to 3.0, and the second threshold value b is set to 6.0. Also, if the frequency spectrum is not higher than 4500 Hz, the first threshold value a to 1.5, and the second threshold value b is set to 4.5. In this regard, if the frequency spectrum is not lower than 2000 Hz and not higher than 4500 Hz, the first threshold value a is set to a value linearly varying between 3.0 and 1.5 as illustrated in accordance with a change in frequency. Also, the second threshold value b is set to a value linearly varying between 6.0 and 4.5 as illustrated in accordance with a change in frequency.

Also, in a third method, first, an average value of the absolute value of the difference is calculated between the size of nonstationarity-value calculation target spectrum in a period not including a voice sound in a recorded sound signal and the amount of stationary noise component of the spectrum estimated by the model estimation unit 12. Further, the average value of the absolute value of the difference is added to the amount of stationary noise component, and the sum is divided by the amount of stationary noise component. And in this manner, the first threshold value "a" of the spectrum is set to the calculated value. Further, the second threshold value b of the spectrum is set to the sum of the first threshold value "a" and a certain constant value. For example, in the case where a certain constant value is 3.5, if the above-described average value to be set as the first threshold value "a" is 2.35, the second threshold value b is set to 2.35+3.5=5.58.

Figure 9:
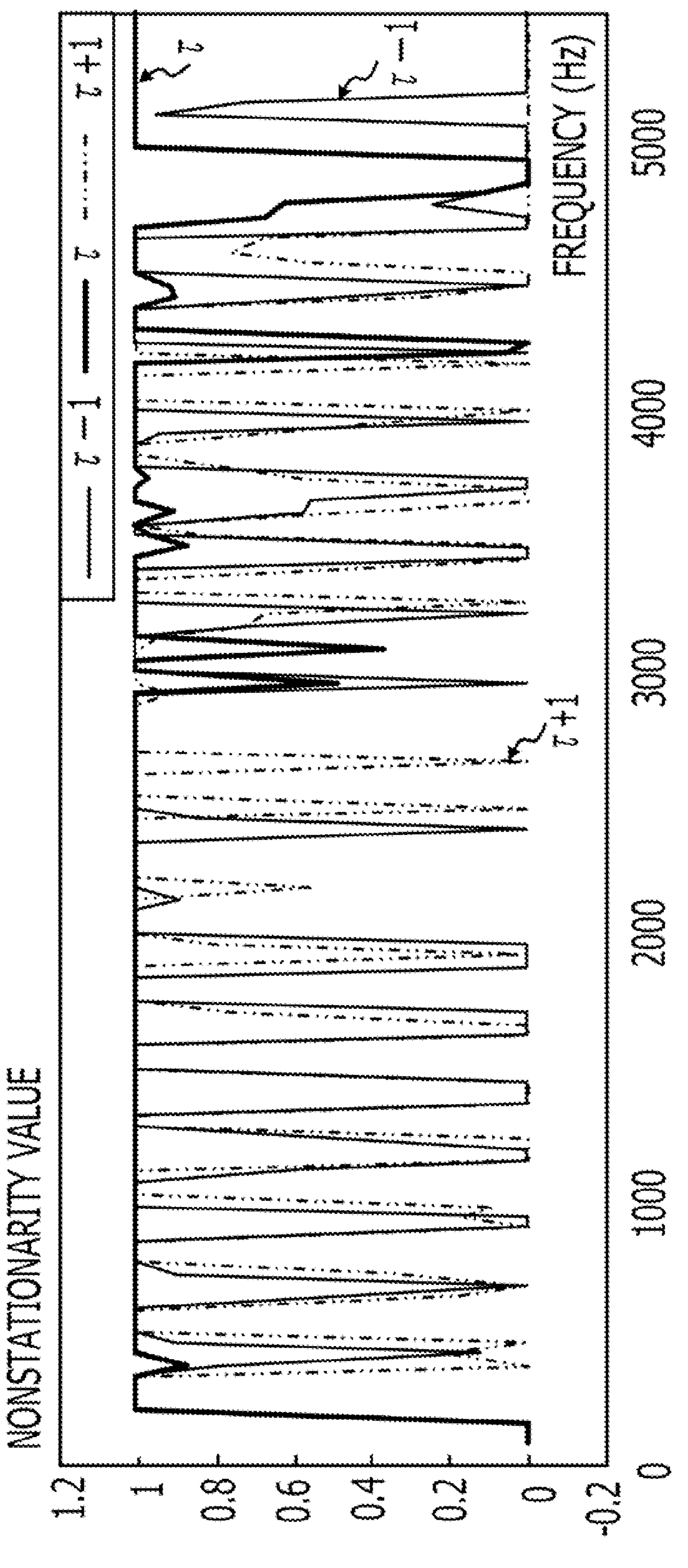
FIG. 9 is a distribution of a nonstationarity value of the recorded sound signal having the spectral distribution in FIG. 6.

Here, a description will be given of FIG. 9. FIG. 9 illustrates a distribution of nonstationarity value of the recorded sound signal having the spectral distribution illustrated in FIG. 6, which is calculated by the nonstationarity-value calculation unit 13.

The horizontal axis in FIG. 9 shows frequency, and the vertical axis shows size of nonstationarity value.

A line type of each waveform in FIG. 9 corresponds to a corresponding line type of each waveform in FIG. 6. That is to say, in FIG. 9, a waveform in "$\tau$" shows a distribution of the nonstationarity value at time $\tau$ when instantaneous nonstationary noise has mixed in. Also, a waveform in "$\tau-1$" shows a distribution of the nonstationarity value at time $\tau-1$, which is one frame of the FFT transform before that time $\tau$. A waveform in "$\tau+1$" shows a distribution of the nonstationarity value at time $\tau+1$, one frame of the FFT transform after that time $\tau$.

As is understood by referring to each waveform in FIG. 9, in the distribution of nonstationarity value shown by the waveform in "$\tau$", the nonstationarity value is 1.0 at many frequencies compared with the distribution of nonstationarity value in "$\tau-1$" and the distribution of nonstationarity value in "$\tau+1$".

In the present embodiment, the nonstationarity-value calculation unit 13 calculates the nonstationarity value as follows.

Next, a description will be given of a method of calculating a nonstationarity-value variation in time. The variation calculation unit 14 performs calculation by the following expression [2] in order to obtain a nonstationarity-value variation in time $\delta NSV(\tau)$ of the calculation-target spectrum at time $\tau$. In this regard, $NSV(\tau)$ is a nonstationarity value of the calculation-target spectrum at time $\tau$.

$$\delta NSV(\tau)=\{|NSV(\tau)-NSV(\tau-1)|+|NSV(\tau+1)-NSV(\tau)|\}/2 \qquad [2]$$

Figure 10:
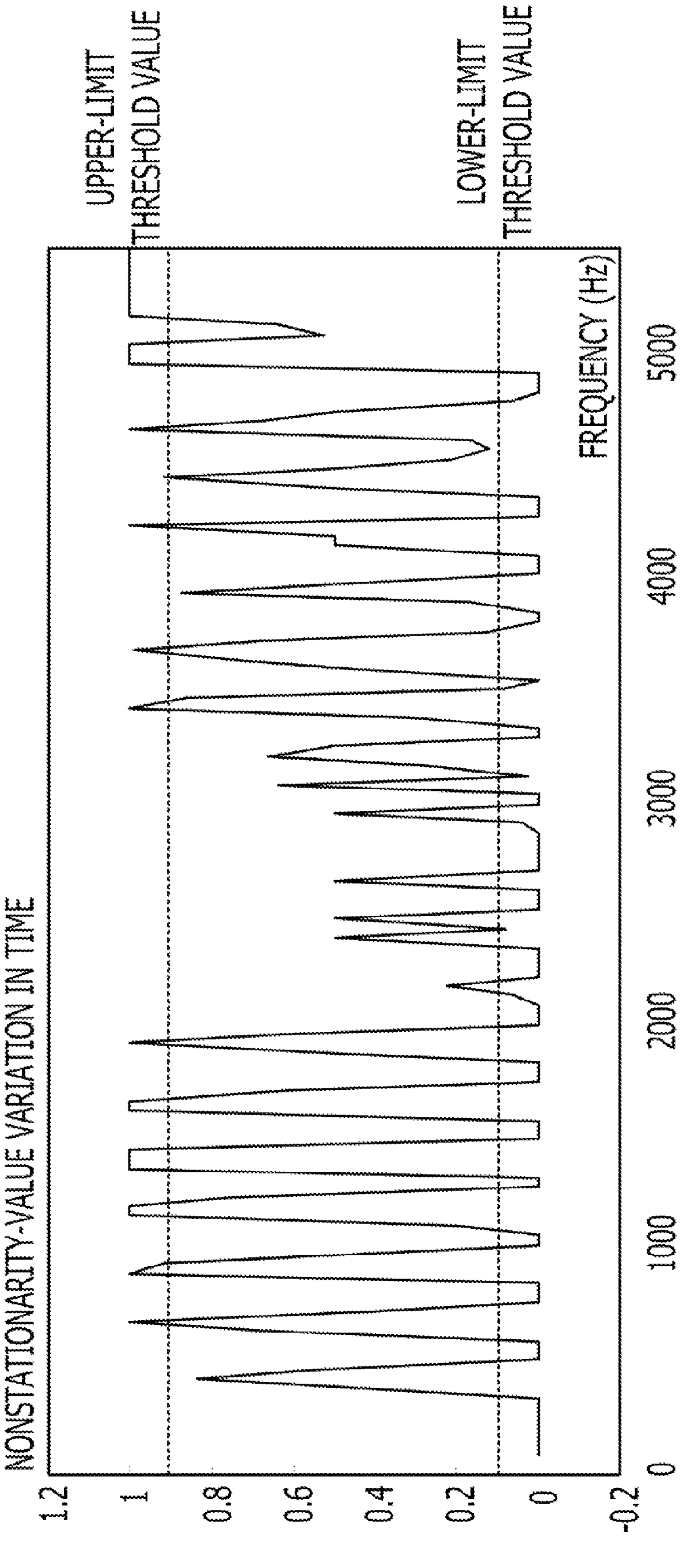
FIG. 10 is a distribution of a nonstationarity-value variation in time of the recorded sound signal obtained from the distribution of FIG. 9.

FIG. 10 is a distribution of the nonstationarity-value variation in time of the recorded sound signal at time $\tau$, which is obtained from the distribution in FIG. 9.

Next, a description will be given of a method of the detection unit 15 determining whether a determination-target spectrum is a nonstationary noise component or not. The detection unit 15 determines whether a determination-target spectrum meets the noise condition. In this regard, in the present embodiment, as the determination condition, any one of three kinds of conditions described below is adopted.

The first determination condition is that a nonstationarity-value variation in time of a determination-target spectrum is greater than a certain upper-limit threshold value. An upper-limit threshold value is 0.9, for example. It is recognizable that such a spectrum is highly possible to be a nonstationary noise component from the example of the spectral distribution of the recorded sound signal at each time in FIG. 6, for example.

However, if all the spectra meeting the first determination condition are all suppressed, the possibility that part of spectrum components of an original voice sound is suppressed becomes high. Thus, fidelity of an original voice sound reproduced from the generated output signal decreases more than the suppression effects of the nonstationary noise.

On the other hand, in a second and third determination conditions described in the following, a suppression-target spectrum is limited to the spectrum whose component can be estimated to be nonstationary noise with high reliability. In this manner, fidelity of the original voice sound reproduced from the generated output signal is improved.

The second determination condition is that the determination-target spectrum meets the following conditions.

First, part of spectra of the recorded sound signal disposed on the frequency axis are classified into a local maximum spectrum and a local minimum spectrum. Here, the local maximum spectrum is a spectrum whose nonstationarity-value variation in time is greater than a certain upper-limit threshold value among spectra of the recorded sound signal. Also, the local minimum spectrum is a spectrum whose non-stationarity-value variation in time is greater than a certain lower-limit threshold value among spectra of the recorded sound signal. The lower-limit threshold value is set to "0.1", for example.

Next, the above-described local maximum spectra are grouped into spectrum groups. If one local maximum spectrum is isolated on the frequency axis without continuation, the spectrum group includes only the one local maximum spectrum. In this regard, a case of being isolated is the case where the local maximum spectrum is sandwiched between the other spectra that are not local maximum spectra. Also, if there are consecutive local maximum spectra on the frequency axis, the spectrum group includes all the consecutive local maximum spectra. The case where there are consecutive local maximum spectra on the frequency axis is a case where the spectrum group does not include a spectrum other than a local maximum spectrum within the group.

Next, attention is given to a positional relationship between the above-described spectrum group and local minimum spectra on the frequency axis. And a spectrum group that exists as only one group near a pair of adjacent local minimum spectra among spectrum groups is extracted. As described above, a pair of adjacent local minimum spectra includes one of local minimum spectra disposed in order of frequency on the frequency axis and one local minimum spectrum next to the one local minimum spectrum in order of frequency on the frequency axis. In this extraction, even if one or more other spectra are sandwiched between the pair of adjacent local minimum spectra and the spectrum group, the spectrum group is extracted.

The second determination condition is that the determination-target spectrum is a local maximum spectrum included in a spectrum group extracted as described above. Such a spectrum is limited to a local maximum spectrum having a nonstationarity-value variation in time that is remarkably large compared with the other spectra in the vicinity on the frequency axis.

In this regard, in the above-described extraction of a spectrum group, if there is only one spectrum group between a pair of adjacent local minimum spectra, the spectrum group is extracted. On the contrary, in the third determination condition, the extraction of the spectrum group is performed in a further strict manner described as follows.

That is to say, first counting is performed on existing numbers of the other spectra that are sandwiched between the extracted spectrum group and the pair of adjacent local minimum spectra on the frequency axis at the upper side and lower side, respectively, on the frequency axis of the spectrum group. And from the spectrum group extracted as described above, spectra are further extracted in the case where the existing number of the spectra individually counted as described above are both 0 or not greater than a certain threshold number. The numeric value is specifically, for example, "3" in the case of sampling frequency of 11025 Hz.

The third determination condition is that the determination-target spectrum is a local maximum spectrum included in the spectrum group further extracted in this manner. Such a spectrum is limited to a local maximum spectrum having nonstationarity-value variation in time that is remarkably larger than the other spectra that are not local maximum spectra in the vicinity of the other spectra on the frequency axis, which meet the second determination condition.

The detection unit 15 determines whether a determination-target spectrum meets the noise condition or not using any one of the three kinds of determination conditions described above so as to determine whether the determination-target spectrum is a nonstationary noise component or not.

Next, a description will be given of a method of setting a suppression gain, which is executed by the gain calculation unit 16.

If it has been determined that the suppression-gain setting target spectrum is not a nonstationary noise component as a result of detection of the nonstationary noise by the detection unit 15, the gain calculation unit 16 first, sets the suppression gain of the spectrum to "1.0". Even when the generation unit 17 multiplies a spectrum whose suppression gain is set to this value by the suppression gain, the spectrum value after the multiplication remains before the multiplication without change.

On the other hand, if it has been determined that the suppression-gain setting target spectrum is a nonstationary noise component as a result of detection of the nonstationary noise by the detection unit 15, the gain calculation unit 16 first, sets the suppression gain using any one of the following three kinds of methods.

The first method is a method in which the suppression gain is set to a fixed value such that the spectrum value after multiplication of the suppression-target spectrum by the fixed value becomes smaller than the size before the multiplication. A specific numeric value of the fixed value is, for example, "0.5". In this regard, a suppression-target spectrum is a spectrum to which a suppression gain is set.

Also, the second method is a method in which, the above-described detection unit 15 performs setting of the suppression gain using the upper-limit threshold value, which is used in the determination method of whether the spectrum is a nonstationary noise component or not. Specifically, first, from spectrum of the recorded sound signal disposed on the frequency axis and smaller than the above-described upper-limit threshold value, each one spectrum having a frequency nearest to the suppression-target spectrum in the upper side and the lower side of the frequency of the suppression-target spectrum is selected. And the suppression gain is set to the average value of the selected two spectrum sizes divided by the size of the suppression-target spectrum.

Also, the third method is a method in which the suppression gain is set using the amount of the stationary noise component of the frequency of the suppression-target spectrum, which is estimated by the model estimation unit 12. More specifically, the suppression gain is set to the amount of the stationary noise component of the frequency of the suppression-target spectrum estimated by the model estimation unit 12 divided by the size of the suppression-target spectrum.

The gain calculation unit 16 sets the suppression gain of the spectrum determined to be a nonstationary noise component using any one of the above-described three kinds of setting method.

In the noise suppression apparatus in FIG. 3, each functional block functions as described above so as to capture a singular point at which a spectrum size of a recorded sound signal changes instantaneously, and to discriminate a voice sound and noise from a rate of change in a nonstationarity value at that time. In this manner, it is possible to generate an output signal in which instantaneous nonstationary noise has been suppressed from a recorded sound signal obtained by recording a human voice sound from the microphone 10.

Figure 11A:
FIGS. 11A and 11B are examples of waveforms illustrating noise suppression effects by the noise suppression apparatus in FIG. 3.
Figure 11B:
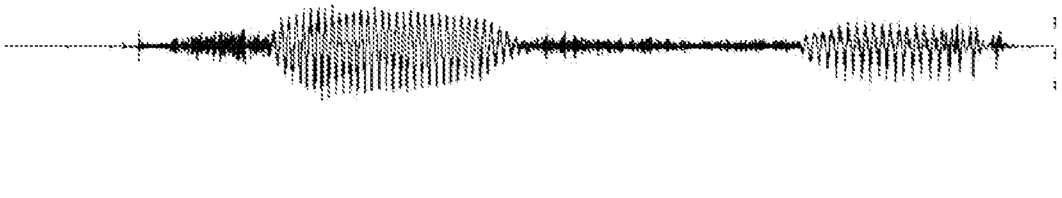

FIG. 11A and FIG. 11B are examples of waveforms illustrating noise suppression effects by the noise suppression apparatus in FIG. 3. FIG. 11B illustrates a waveform of an output signal when a recorded sound signal having a waveform illustrated in FIG. 11A is input into the noise suppression apparatus as a recorded sound signal. By the noise suppression apparatus in FIG. 3, it is possible to suppress instantaneous nonstationary noise mixed in a voice sound in this manner.

Also, when instantaneous nonstationary noise is mixed in stationary noise, it is possible for the noise suppression apparatus to suppress only the nonstationary noise. Accordingly, it is also possible for the noise suppression apparatus to reduce so-called musical noise that sometimes occurs when stationary noise is suppressed.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A noise suppression apparatus comprising:
a memory, and
a processor coupled to the memory and configured to
- convert a recorded sound signal in a time domain into a plurality of spectra in a frequency domain;
- calculate an amount of stationary noise component continuously included in each of the plurality of spectra;
- calculate a nonstationarity value indicating a ratio of a nonstationary component included in each of the plurality of spectra based on the amount of stationary noise component;
- determine whether each of the plurality of spectra is nonstationary noise and acquire determination results based on time variation of the nonstationarity value, the nonstationary noise indicating instantaneous noise and being different from the stationary noise;
- set a suppression gain indicating a degree of suppression on each of the plurality of spectra based on the determination results;
- suppress each of the plurality of spectra on the basis of the suppression gain; and
- convert the plurality of spectra into a signal in the time domain.

2. The noise suppression apparatus according to claim 1, wherein the processor is configure to calculate an average value of the plurality of spectra in a period of not including a sound of a sounding body in the recorded sound signal for each frequency spectrum as the amount of a stationary noise component.

3. The noise suppression apparatus according to claim 1, wherein the processor is configured to:
- set the suppression gain to a first value for a spectrum determined to include the nonstationary noise; and
- set the suppression gain to a second value greater than the first value for a spectrum determined to include the stationary noise.

4. The noise suppression apparatus according to claim 3, wherein the processor is configured to:
- determine a spectrum having nonstationarity-value variation in time greater than an upper threshold value to include a nonstationary component; and
- determine a spectrum having the nonstationarity-value variation in time less than an upper threshold value not to include a nonstationary component.

5. The noise suppression apparatus according to claim 4, wherein the processor is configured to:
- select, from among the spectra sorted in order of frequency, each one frequency nearest, in a higher frequency and a lower frequency, to the frequencies of the suppression-target spectra determined to have a nonstationary noise component from spectrum frequencies having the frequency value less than the upper-limit value; and
- set an average value of the values of the selected two spectra divided by the value of the suppression-target spectrum to be a suppression gain for the suppression-target spectrum.

6. The noise suppression apparatus according to claim 3, wherein the processor is configured to:
- determine, from among spectra sorted in order of frequency, a spectrum having nonstationarity-value variation in time greater than a certain upper-limit threshold value to be a local maximum spectrum;
- determine, from among the spectra sorted in order of frequency, a spectrum having the nonstationarity-value variation in time less than a certain lower-limit threshold value to be a local minimum spectrum, and identify a spectrum group including only one of the maximum spectra; and
- when the spectrum group is a spectrum group including only one group of the spectrum groups among a pair of adjacent local minimum spectra including one local minimum spectrum arranged on the frequency axis in order of frequency and a local minimum spectrum next to the one local minimum spectrum in order of frequency, determine a local maximum spectrum included in the spectrum group to include a spectrum component being nonstationary noise.

7. The noise suppression apparatus according to claim 3, wherein the processor is configured to:
- identify, from among the spectra sorted in order of frequency, a spectrum group including a local maximum spectrum being a spectrum having a nonstationarity-value variation in time greater than a certain upper-limit threshold value continuously on the frequency axis; and
- when the spectrum group is a spectrum group including only one group of the spectrum groups among a pair of adjacent local minimum spectra including one local minimum spectrum arranged on the frequency axis in order of frequency and a local minimum spectrum next to the one local minimum spectrum in order of frequency, determine a local maximum spectrum included in the spectrum group to include a spectrum component being nonstationary noise.

8. The noise suppression apparatus according to claim 1, wherein the processor is configured to:
- calculate an amount of stationary noise component included in the recorded sound signal for each frequency spectrum;
- determine whether each spectrum component is nonstationary noise for each frequency spectrum on the basis of the nonstationarity-value variation, and for a suppression-target spectrum determined to be the nonstationary noise; and set a value produced by dividing an amount of the nonstationary noise component calculated by the estimation unit by a value of the suppression-target spectrum to be the suppression gain.

9. The noise suppression apparatus according to claim 1, wherein the processor is configured to:

calculate a signal-to-noise ratio of each frequency spectrum; and determine a spectrum having the signal-to-noise ratio less than a certain first threshold value to have a nonstationarity value of 0.

10. The noise suppression apparatus according to claim 9, wherein the processor is configured to:

calculate a signal-to-noise ratio of frequency spectrum; and determine a spectrum having the signal-to-noise ratio greater than a certain second threshold value which is greater than the first threshold value to have a nonstationarity value of 1.

11. The noise suppression apparatus according to claim 10, wherein the processor is configured to:

select, from a plurality of combinations of the first threshold value and the second threshold value, one pair in accordance with a frequency of a spectrum having the nonstationarity value to be calculated.

12. The noise suppression apparatus according to claim 10, wherein the processor is configured to:

calculate an average value of an absolute value of a difference between each spectrum value and an amount of the stationary noise component in a period not including sound of the sounding body in the recorded sound signal for each frequency spectrum;

determine a value produced by dividing a sum of the amount of the stationary noise component and the average value of the absolute value of the difference by an amount of a stationary noise component to be the first threshold value for each of the spectrum; and determine a value produced by adding a certain constant value to the first threshold value to be the second threshold value for each of the spectrum.

13. A noise suppression method executed by a computer, the noise suppression method comprising:

convert a recorded sound signal in a time domain into a plurality of spectra in a frequency domain;

calculating an amount of stationary noise component continuously included in each of the plurality of spectra;

calculating a nonstationarity value indicating a ratio of a nonstationary component included in each of the plurality of spectra based on the amount of stationary noise component;

determining whether each of the plurality of spectra is nonstationary noise and acquiring determination results based on time variation of the nonstationarity value, the nonstationary noise indicating instantaneous noise and being different from the stationary noise;

setting a suppression gain indicating a degree of suppression on each of the plurality of spectra based on the determination results;

performing suppression on each of the plurality of spectra on the basis of the suppression gain set for each, of the plurality of spectra; and converting the plurality of spectra into a signal in the time domain.

14. A non-transitory computer-readable storage medium storing a noise suppression program that causes a computer to execute a process, the process comprising:

converting a recorded sound signal in a time domain into a plurality of spectra in a frequency domain;

calculating an amount of stationary noise component continuously included in each of the plurality of spectra;

calculating a nonstationarity value indicating a ratio of a nonstationary component included in each of the plurality of spectra based on the amount of stationary noise component;

determining whether each of the plurality of spectra is nonstationary noise and acquiring determination results based on time variation of the nonstationarity value, the nonstationary noise indicating instantaneous noise and being different from the stationary noise;

setting a suppression gain indicating a degree of suppression on each of the plurality of spectra based on the determination results;

performing suppression on each of the plurality of spectra on the basis of the suppression gain set for each of the plurality of spectra; and converting the plurality of spectra into a signal in the time domain.

* * * * *